July 31, 1923.
F. J. COCHRAN
ROLLER AND BALL BEARING AXLE STRUCTURE
Filed Aug. 30, 1922    2 Sheets-Sheet 1
1,463,196
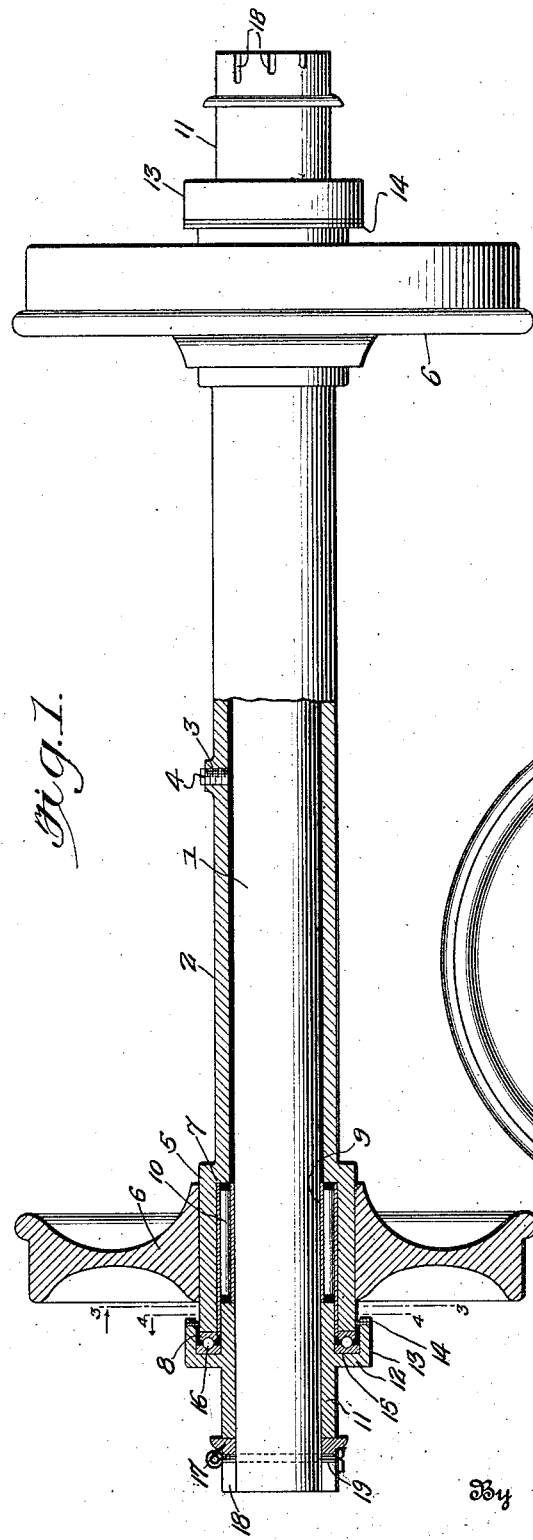
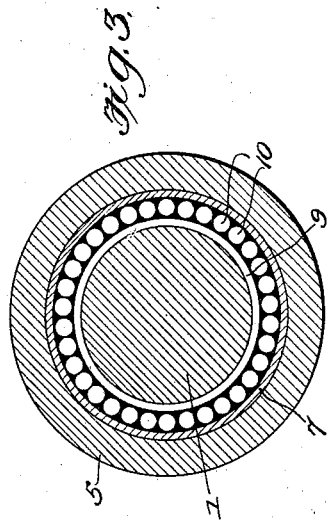
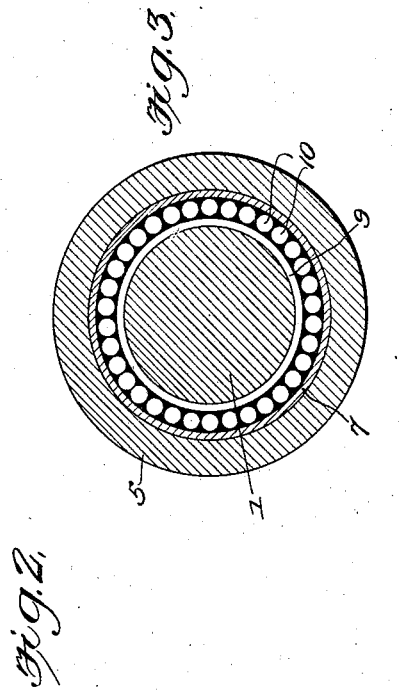
Inventor
F. J. Cochran,
By
Attorney July 31, 1923.　　　　　　　　　　　　　　　　　　　1,463,196
F. J. COCHRAN
ROLLER AND BALL BEARING AXLE STRUCTURE
Filed Aug. 30, 1922　　　2 Sheets-Sheet 2
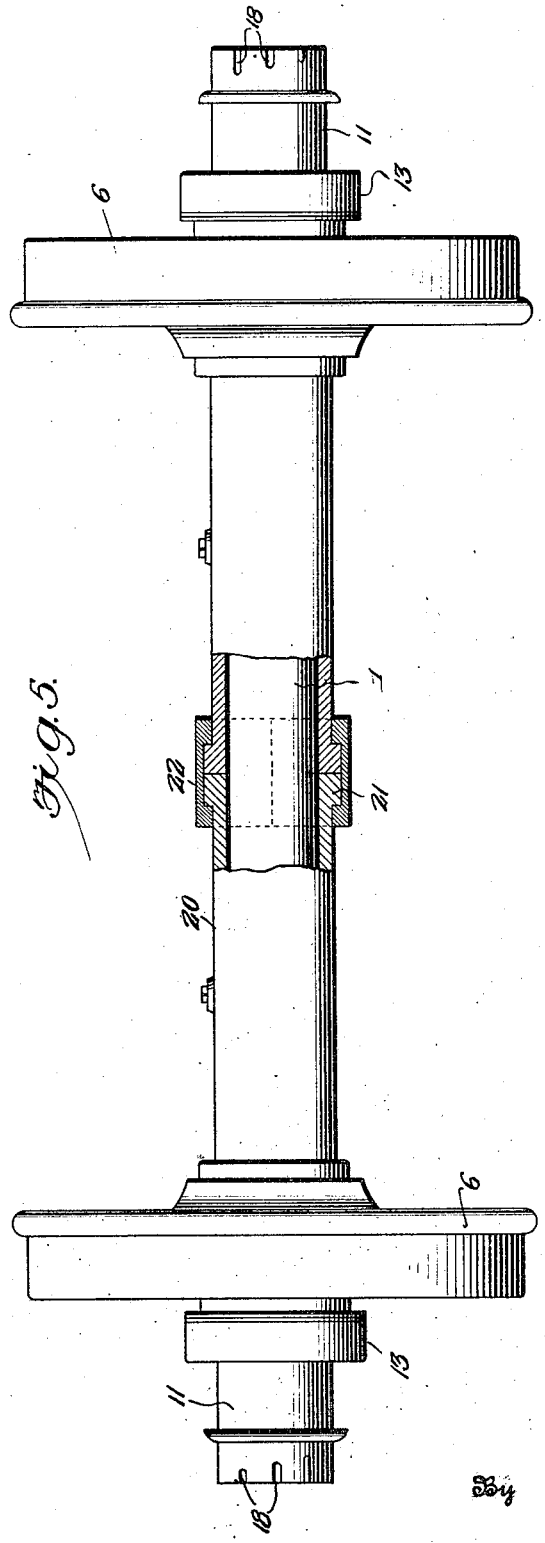
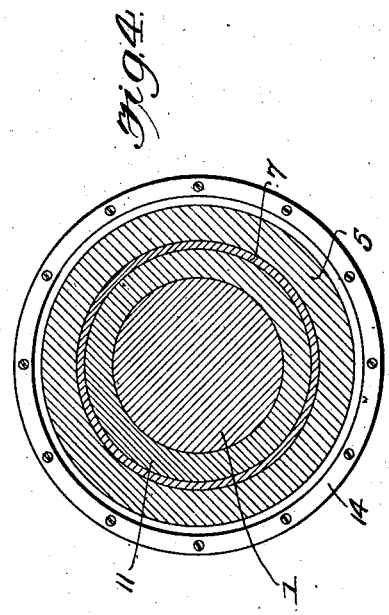
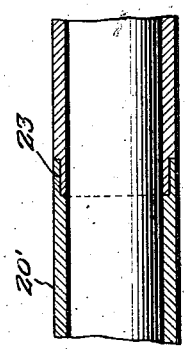
Inventor
F. J. Cochran,
By
Attorney Patented July 31, 1923.

1,463,196

UNITED STATES PATENT OFFICE.

FRED J. COCHRAN, OF MOUNT VERNON, ILLINOIS.

ROLLER AND BALL BEARING AXLE STRUCTURE.

Application filed August 30, 1922. Serial No. 585,303.

*To all whom it may concern:*

Be it known that I, FRED J. COCHRAN, a citizen of the United States, residing at Mount Vernon, in the county of Jefferson and State of Illinois, have invented certain new and useful Improvements in Roller and Ball Bearing Axle Structures, of which the following is a specification.

This invention relates to roller and ball bearing axle structures and it consists in the novel features hereinafter described and claimed.

A primary object of the invention is to provide a structure of the character stated which is of a simple and durable nature and which is especially adapted to effectually withstand the various strains and wear to which it is subjected when used upon railway car axles. In the event that the structure as hereinafter described is used upon rolling stock equipped with means for propelling by rotating the axle directly from the source of power the roller and ball bearing structures at the opposite ends of the axle are connected together by a differential transmission mechanism of usual pattern.

A further object of the invention is to provide in a structure of the character stated two sets of anti-friction bearing members, one set being of the ball type and the other set being of the roller type, there being a mutuality of cooperation between these two sets of anti-friction bearing members in that the roller bearing members are arranged to sustain the weight of the load and the ball bearing anti-friction members are arranged to resist the wear and friction incident to thrust strain when the rolling stock is in motion and passing around curves.

Therefore, minimum power is required for moving the rolling stock over the rails and friction is practically eliminated.

A still further object of the invention is to provide in such a structural arrangement a mutual co-action between the sleeve and the axle shaft whereby all twisting or jamming strain is distributed between the sleeve and the axle shaft and thereby relieving the bearing of such strain.

A still further object of the invention is to provide in a structure of the character stated sufficient space between the axle sleeve and the axle shaft to retain a volume of lubricant sufficient to efficiently lubricate both sets of bearing members for an indefinite period of time.

A further object of the invention is to provide in a structure of the character stated a cap especially designed to serve as a ball race, a dust guard for both sets of anti-friction members and means for closing the end of the sleeve and means for sustaining the weight of the load upon the complete axle structure.

A still further object of the invention is to provide a ball and roller bearing axle or journal for the wheels in which there is a roller or ball bearing engagement between all contacting points thus reducing the friction to a minimum and which will obviate all danger of the wheels leaving the rails on account of lateral displacement, and to provide a ball and roller bearing axle which will allow the wheels to turn independently of each other.

With the foregoing and other objects in view as will appear as the nature of the invention is better understood, the same consists in the novel features of construction, combination and arrangement of parts illustrated in the drawings and more particularly pointed out in the appended claims.

In the accompanying drawings:—

Figure 1 is a side elevation of the roller and ball bearing axle structure with parts thereof shown in section.

Figure 2 is an end elevation of the same.

Figure 3 is an enlarged transverse sectional view of the same cut on the line 3—3 of Figure 1.

Figure 4 is a transverse sectional view of the same cut on the line 4—4 of Figure 1.

Figure 5 is a side elevation of a modified form of the roller and ball bearing axle structure with parts broken away and parts shown in section.

Figure 6 is a detailed sectional view of still another modified form of arrangement which may be used in the roller and ball bearing axle structure.

The roller and ball bearing axle structure, in the form of the invention as shown in Figures 1, 2, 3 and 4 comprises an axle proper 1 which is of standard size and form. A sleeve 2 is mounted upon the intermediate portion of the axle 1 and surrounds the said axle. The interior surface of the sleeve 2 is spaced from the surface of the axle and this space is utilized for holding a lubricant which is supplied to the roller and ball bearing features as will be hereinafter described.

The sleeve 2 is provided at a point midway between its ends with an orifice 3 through which the said lubricant may be introduced into the space between the inner surface of the sleeve and the axle. The orifice 3 is normally closed by a plug 4 in a usual manner.

The sleeve 2 is provided at its end portions with enlargements 5 upon the exterior surfaces of which car wheels 6 are mounted. Linings 7 are applied to the inner surfaces of the enlargements 5 and the outer ends of the said linings project beyond the outer end edges of the enlargements 5 as best shown in Figure 1 of the drawings. Ball race rings 8 are applied to the outer ends of the enlargements 5 and receive the outer end portion of the linings 7. Cylindrical wear plates 9 are mounted upon the axle 1 and are held in the enlarged portions 5 of the sleeve 2. Roller bearing members 10 are interposed between the linings 7 and the wear plates 9 and said bearing members are shorter than the wear plates 9 and may have slight longitudinal movement between the said plates and the linings.

Each roller bearing as hereinbefore described is closed by a cap and as the structures of the caps are alike a description of one cap will suffice. Each cap comprises a cylindrical body portion 11 which fits snugly upon the outer end portion of the axle 1 and the inner end of the body portion 11 enters the lining 7 and terminates adjacent the end of the wear plate 9 and the outer ends of the rollers 10. Therefore the cap serves to assist in holding the rollers and the wear plate in proper position in the enlargement 5 of the sleeve. The body 1 of the cap is provided at a point between its ends with a collar portion 12 having at its outer edge an annular flange 13 the inner surface of which is spaced from the exterior surface of the body 11 thereby forming a pocket. The outer end portion of the enlargement 5 is received in the space between the flange 13 and the body and a dust guard ring 14 is carried at the edge of the flange and bears against the enlargement 5 and closes the space between the flange and the enlargement and prevents the entrance of dust or grit. A ball race ring 15 may be mounted at the bottom of the pocket provided between the flange 13 and the body 11 and bearing balls 16 are interposed between the race ring 15 and the ring 8 hereinbefore described. Castings (not shown) may be made to rest upon the body 11 to fit any truck frame desired.

A band 17 is mounted upon the end portion of the axle 1 and bears against the outer end of the body 11 of the cap. The band 17 is provided at its outer portion with several series of slots 18 and the slots of the different series vary in length. A pin 19 passes transversely through the axle 1 and its end portions are held in two of the slots 18 and thus means are provided for holding the cap in position upon the axle. As the cap or the adjacent parts wear the band 17 may be adjusted along the axle 1 until the parts are brought to proper relation with respect to each other and then the pin 19 is removed and the band 17 is turned to bring shorter slots 18 into register with the pin opening in the axle 1 and then the pin is inserted into the said opening through the said shorter slot and the parts are held at the adjusted positions.

In operation, the roller bearings sustain the weight of the load and the ball bearings take up the thrust strain when the car is swayed or moving around a curve in the track. Thus these strains and forces are distributed between the axle and the sleeve and the structure will hold together in the event that either the axle or the sleeve will be broken while in transit. Further advantages of the structural arrangement are enumerated as follows. The wheels are rigidly mounted upon the sleeve and they rotate independently of the axle proper and carry the bearing roller around with them. The weight of the load is sustained by the bearing rollers at the lower side of the axle and consequently the bearing rollers at the top side of the axle are free and the said rollers may readily move over the center of the axle when the parts are in motion, thereby eliminating wear and friction. During the lateral or swaying movement of the car or truck frame sufficient play is provided between the bearing balls and the ball races and the ends of the rollers and the adjacent parts to permit the balls and rollers to move without friction or binding. When the parts of the axle structure are assembled there in no actual or frictional contact between them except where the dust guard fits snugly over the end of the sleeve. The entire axle structure may be lubricated with cup grease or hard oil which is injected into the space between the axle and the sleeve and plugged up so that the only way for the grease to escape is by working out at the ends of the axle and it must pass through the spacing between the rollers, around the end of the sleeve and thence through the ball bearing and out under the dust guard ring which also serves as a packing for retaining the grease. In a car structure having the roller and ball bearing axle as described the axle will not run hot. The car may be moved by the application of much less power or pulling force than would be required otherwise, and the structure may be used for an indefinite period of time without attention.

In the form of the structural arrangement as shown in Figure 5 of the drawing the axle sleeve is composed of sections 20 which are aligned with each other around the axle 1 and which abut against each other at their inner ends. The sections 20 are provided at their inner ends with outstanding annular collars 21 and the coupling member 22 is applied to the collars 21 whereby the sleeve sections may turn or rotate independently of each other. Thus one wheel may rotate faster than the other when the car and axle are moving around a curve and without friction, binding or slipping.

In the form of the arrangement as shown in Figure 6 of the drawing the sleeve is made up of sections 20' which are provided at their inner ends with over and under lapping flanges 23 which loosely engage each other and without the use or assistance of a coupling member, ring or collar.

In this arrangement the adjacent sleeve sections may run or rotate independently of each other and the over and under lapping flanges at the ends of the sleeve sections prevent the escape of the lubricant between the inner ends of the sleeve.

In all forms of the invention a double axle structure is provided, that is to say a sleeve with an axle properly located therein. The wheels are mounted upon the sleeve and are entirely free to rotate around the axle proper. In the enlargements at each end of the sleeve any type of bearing desired may be used. The wheels being mounted upon the sleeve they revolve freely around the axle proper. The sleeve extends through the wheels and forms an abutment against the ball bearings held in the caps on the ends of the axle proper. The caps project over the ends of the sleeve far enough to permit a suitable dust guard in the ends of the caps and around the sleeve. Said dust guard acts as packing to retain grease which is held in the sleeve between the wheels and inside of the sleeve in the space between the sleeve and the axle.

Having described the invention, what is claimed is:—

1. A roller and ball bearing axle structure comprising an axial proper, a sleeve mounted thereon and provided with an enlarged end portion, a lining member fitting in the enlarged portion of the sleeve and having an end portion disposed beyond the end of the sleeve, a wear plate mounted upon the axle, bearing rollers interposed between the wear plate and the lining and being shorter in length than the length of the wear plate, a cap mounted upon the axle and having a body portion which enters the enlargement of the sleeve and the lining and which terminates adjacent the edge of the wear plate, said cap having a flange and a pocket interposed between the flange and the body, a dust ring carried upon the flange and bearing against the end of the enlargement of the sleeve, a race ring located in the pocket of the cap and bearing balls interposed between the race rings.

2. A roller and ball bearing axle structure comprising an axle proper, a sleeve mounted thereon and composed of sections connected together at their inner ends for turning movement independently of each other and provided at their inner ends with diametrically enlarged portions, a lining member fitting in the enlarged portion and having an end portion disposed beyond the end of the sleeve, a wear plate mounted upon the axle, bearing rollers interposed between the wear plate and the lining and being shorter in length than the length of the wear plate, a cap mounted upon the axle and having a body portion which enters the enlargement of the sleeve and lining and which terminates adjacent the edge of the wear plate, said cap having a flange and a pocket interposed between the flange and the body, a dust ring carried upon the flange and bearing against the enlargement of the sleeve, a race ring surrounding the projecting end portion of the lining and bearing against the end of the enlargement of the sleeve, a race ring located in the pocket of the cap and bearing balls interposed between the race rings.

3. A roller and ball bearing axle structure comprising an axle proper, a sleeve mounted thereon and composed of sections having at their inner ends over and under lapping flanges fitting snugly against each other, each sleeve section being provided at its outer end with a diametrically enlarged portion, a lining member fitting in the enlarged portion of the sleeve and having an end portion disposed beyond the end of the sleeve, a wear plate mounted upon the axle, bearing rollers interposed between the wear plate and the lining and being shorter than the length of the wear plate, a cap mounted upon the axle and having a body portion which enters the enlargement of the sleeve and the lining and which terminates adjacent the edge of the wear plate, said cap having a flange and a pocket interposed between the flange and the body, a dust ring carried upon the flange and bearing against the enlargement of the sleeve, a race ring surrounding the projecting end portion of the lining and bearing against the end of the enlargement of the sleeve, a race ring located in the pocket of the cap and bearing balls interposed between the race rings.

4. In a roller and ball bearing axle structure, an axle proper, a sleeve mounted thereon, bearing rollers interposed between the sleeve and the axle, a cap mounted upon the axle and having a body portion adapted to limit the longitudinal movement of the bearing rollers, bearing balls interposed between the cap and the sleeve, a band mounted upon the axle and provided at its edge with several sets of slots which vary in length, the inner face of the band bearing against the end of the cap and a pin passing through the axle and having its end portion received in oppositely disposed slots of the band.

In testimony whereof, I affix my signature.

FRED J. COCHRAN.